US011582280B2

(12) United States Patent
Ravala et al.

(10) Patent No.: US 11,582,280 B2
(45) Date of Patent: *Feb. 14, 2023

(54) COMPUTER-BASED SYSTEMS CONFIGURED TO ADJUST DATA CAPACITY IN A DATA STREAM GENERATED FROM MULTIPLE DATA PRODUCER APPLICATIONS AND METHODS OF USE THEREOF

(71) Applicant: Capital One Services, LLC, McLean, VA (US)

(72) Inventors: Yasaswy Rajendraprasad Ravala, McLean, VA (US); Sudha Shiva Kumar Marri, McLean, VA (US); Arunkumar Natarajan, Glen Allen, VA (US); Krystan R. Franzen, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,060

(22) Filed: Apr. 18, 2022

(65) Prior Publication Data

US 2022/0239713 A1 Jul. 28, 2022

Related U.S. Application Data

(63) Continuation of application No. 17/002,363, filed on Aug. 25, 2020, now Pat. No. 11,310,297.

(51) Int. Cl.
*H04L 29/08* (2006.01)
*H04L 65/613* (2022.01)
(Continued)

(52) U.S. Cl.
CPC .............. *H04L 65/613* (2022.05); *G06F 8/65* (2013.01); *G06F 16/2255* (2019.01);
(Continued)

(58) Field of Classification Search
CPC ................. H04L 65/4092; H04L 67/34; G06F 16/24568
(Continued)

(56) References Cited

U.S. PATENT DOCUMENTS 8,468,244 B2  6/2013 Redlich et al.
8,495,686 B2  7/2013 Maddali et al.
(Continued)

OTHER PUBLICATIONS

International Search Report and Written Opinion from International Application No. PCT/US2021/047315 dated Nov. 23, 2021.
(Continued)

*Primary Examiner* — Sibte H Bukhari
(74) *Attorney, Agent, or Firm* — Greenberg Traurig, LLP

(57) ABSTRACT

A method includes receiving from a transmitting data interface, a data stream mapping of a data input into data shards for transmission in a data stream over a data stream communication channel. Data capacity for a data producing software application from a plurality of data producing software applications is adjusted by increasing or decreasing a number of data shards in the data stream assigned to the data producing software application. An updated data stream mapping of the data input into the plurality of data shards is generated by updating a start hash key and an end hash key in a range for each of the data shards assigned to the data producing software application. The updated data stream mapping is sent to the transmitting data interface for adjusting the data capacity in the data stream transmitted over the data stream communication channel of the data producing software application.

16 Claims, 15 Drawing Sheets

(51) Int. Cl.
*H04L 67/00* (2022.01)
*G06F 16/2455* (2019.01)
*G06F 16/22* (2019.01)
*G06F 8/65* (2018.01)
*G06F 3/04847* (2022.01)

(52) U.S. Cl.
CPC ........ *G06F 16/24568* (2019.01); *H04L 67/34* (2013.01); *G06F 3/04847* (2013.01)

(58) Field of Classification Search
USPC .......................................................... 709/219
See application file for complete search history.

(56) References Cited

U.S. PATENT DOCUMENTS

| | | | |
|---|---|---|---|
| 2003/0191848 A1 | 10/2003 | Hesselink et al. | |
| 2014/0304402 A1* | 10/2014 | Prakash | H04L 43/0882 709/224 |
| 2018/0359811 A1* | 12/2018 | Verzun | H04W 28/12 |
| 2019/0324935 A1 | 10/2019 | Coddington et al. | |
| 2020/0349108 A1* | 11/2020 | Seshadri | G06F 16/1727 |

OTHER PUBLICATIONS

Amazon Kinesis Data Streams: Developer Guide; 2020.
Amazon Kinesis Data Streams Service; API Reference, API Version Dec. 2, 2013.

\* cited by examiner

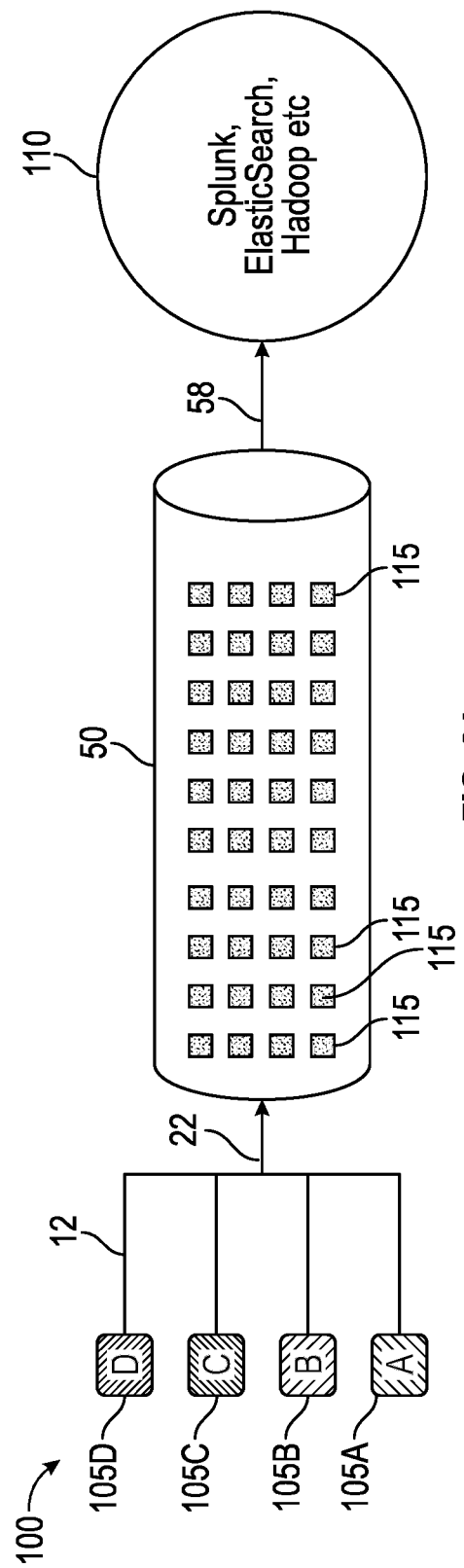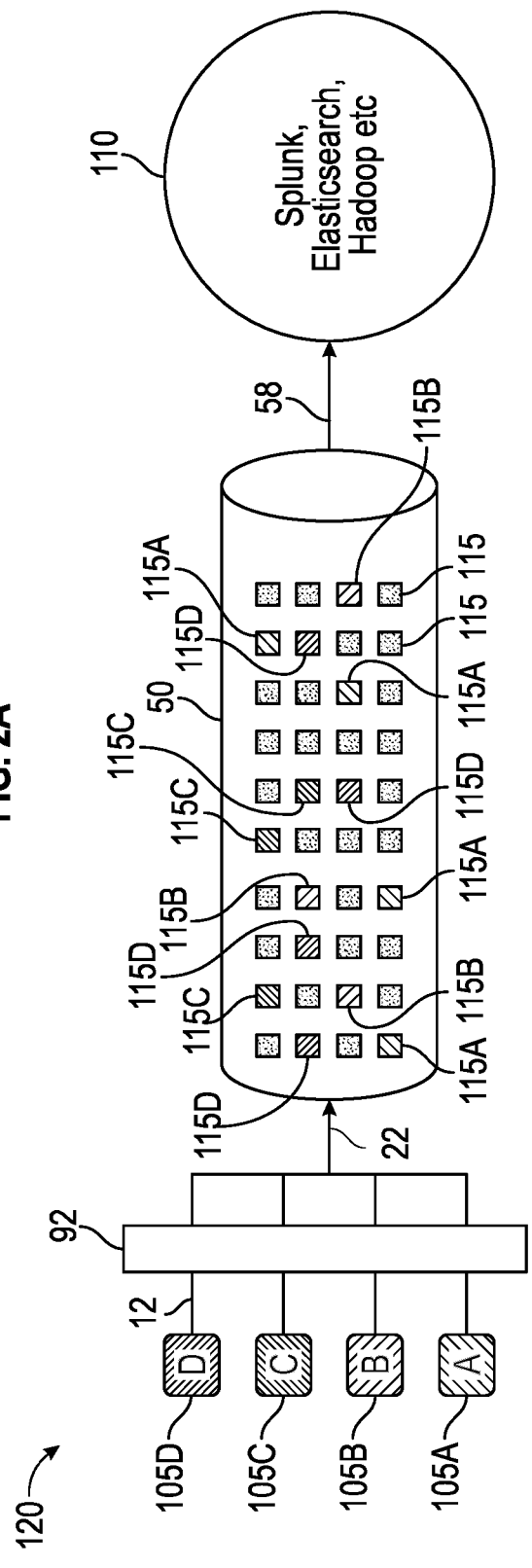

US 11,582,280 B2

COMPUTER-BASED SYSTEMS CONFIGURED TO ADJUST DATA CAPACITY IN A DATA STREAM GENERATED FROM MULTIPLE DATA PRODUCER APPLICATIONS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to computing systems, and particularly to methods and systems for adjusting data capacity in a data stream generated from multiple data producer applications.

BACKGROUND OF TECHNOLOGY

A computer network platform/system may include a group of computers (e.g., clients and servers) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that includes at least the following steps of:
receiving, by a processor, from a transmitting data interface, a data stream mapping of a data input into a plurality of data shards for transmission in a data stream over a data stream communication channel from the transmitting data interface to a receiving data interface;
wherein the data input may be generated by a plurality of data producing software applications;
wherein the transmitting data interface and the receiving data interface may be managed by a data streaming service;
wherein each data shard may be defined by a start hash key and an end hash key in a range of hash keys assigned by the data streaming service;
adjusting, by the processor, data capacity for at least one data producing software application in the plurality of data producing software applications by increasing or decreasing a number of data shards in the data stream assigned to the at least one data producing software application;
generating, by the processor, an updated data stream mapping of the data input into the plurality of data shards by updating the start hash key and the end hash key in the range for each of the number of data shards assigned to the at least one data producing software application in the data stream mapping; and
sending, by the processor, to the transmitting data interface, the updated data stream mapping for adjusting the data capacity in the data stream transmitted over the data stream communication channel for the at least one data producing software application.

In some embodiments, the present disclosure provides an exemplary technically improved computer-based system that includes at least the following components of:
a memory; and
at least one processor configured to execute code stored in the memory that causes the at least one processor to:
receive from a transmitting data interface, a data stream mapping of a data input into a plurality of data shards for transmission in a data stream over a data stream communication channel from the transmitting data interface to a receiving data interface;
wherein the data input may be generated by a plurality of data producing software applications;
wherein the transmitting data interface and the receiving data interface may be managed by a data streaming service;
wherein each data shard may be defined by a start hash key and an end hash key in a range of hash keys assigned by the data streaming service;
adjust data capacity for at least one data producing software application in the plurality of data producing software applications by increasing or decreasing a number of data shards in the data stream assigned to the at least one data producing software application;
generate an updated data stream mapping of the data input into the plurality of data shards by updating the start hash key and the end hash key in the range for each of the number of data shards assigned to the at least one data producing software application in the data stream mapping; and
send to the transmitting data interface, the updated data stream mapping for adjusting the data capacity in the data stream transmitted over the data stream communication channel for the at least one data producing software application.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 2A-2B are exemplary embodiments for adjusting data capacity in a data stream generated from multiple data producing software applications, in accordance with one or more embodiments of the present disclosure;

DETAILED DESCRIPTION

Figure 1:
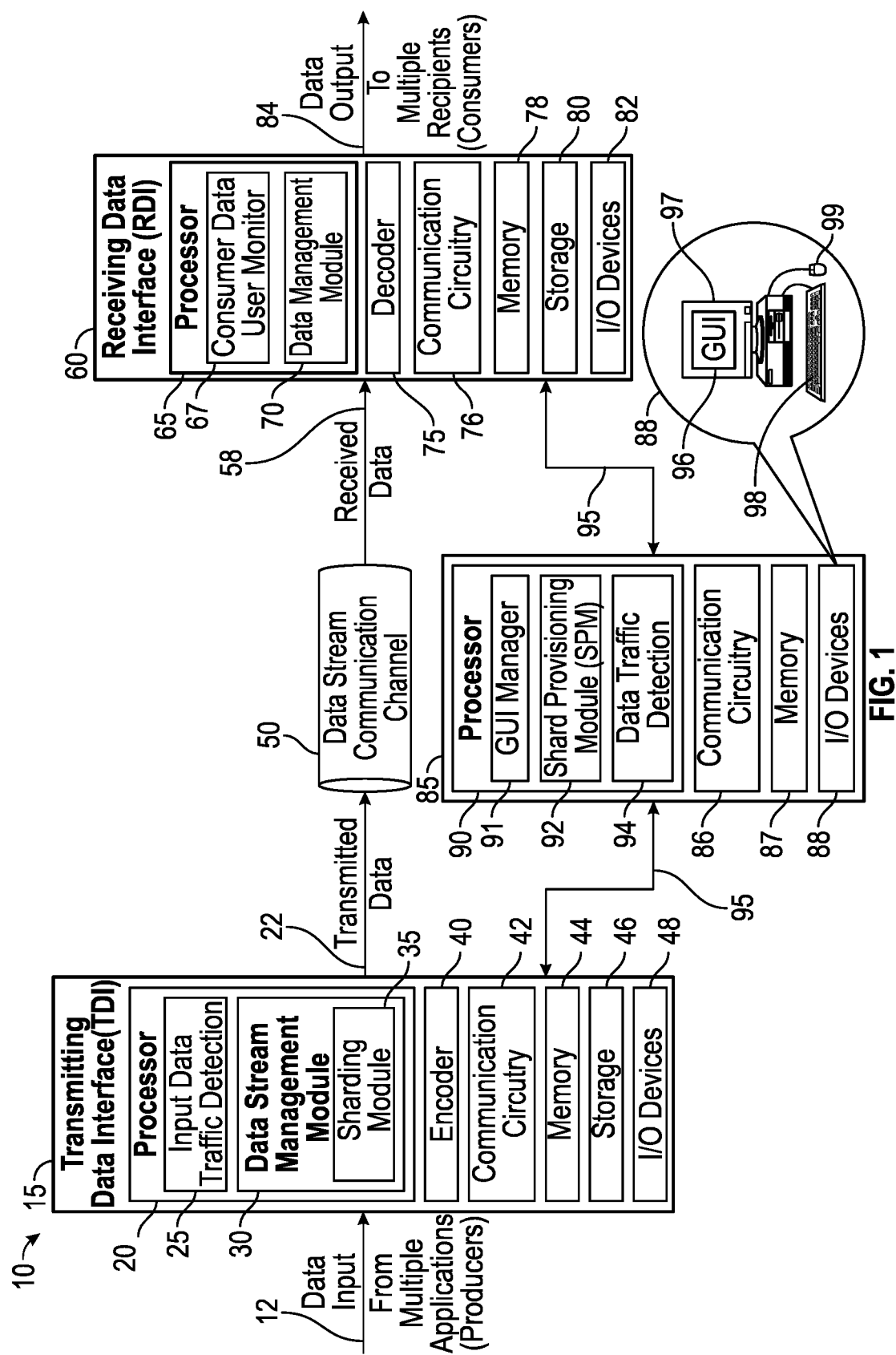
FIG. 1 is a system for adjusting data capacity in a data stream generated from multiple data producing software applications, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Embodiments of the present disclosure herein disclose systems and methods for adjusting data capacity in a data stream generated from a plurality of data producing software applications. The plurality of data producing software applications may generate data for transmission by a transmitting data interface (TDI) in the data stream over a data stream communication channel to a receiving data interface (RDI) which may deliver the received data to at least one data consumer (also referenced herein as a data recipient). In some embodiments, an exemplary data streaming service of the present disclosure, managing the TDI and RDI, may charge a customer based on the amount of data capacity over the data stream communication channel and may allow the data customer to request more data capacity if needed. Note that the terms "customer" and "user" may be used interchangeably herein.

In some embodiments, due to changes in the amount of data generated by any of the data producing software applications, the data capacity may be dynamically increased or decreased in the data stream communication channel as needed. The embodiments of the present disclosure herein present a new approach for allowing a user to dynamically allocate data capacity to any or all of the plurality of data producing software applications over the data stream communication channel by increasing or decreasing a number of shards (e.g., data sub-units) allocated to each of the plurality of data producing software applications, practically improving operations of computer-based communication networks and computer-based data processing.

In some embodiments, the data stream may be represented by a group of data records. The data records in a data stream may be distributed into shards. As referenced herein, a shard may be a sequence of data records transmitted in the data stream. The term "shard" may be used synonymously herein with the terms "partition" and "data sub-unit".

When a data stream is created by the exemplary data streaming service of the present disclosure, the user may specify the number of shards for the overall data stream. A data shard may have a fixed data capacity. For example, a single shard may allow reads of 2 MB per second and writes of 1 MB per second. For example, a single shard may allow reads of 1-5 MB per second and writes of 0.5-2 MB per second.

Thus, the total data capacity of the data stream is the sum of the data capacities of all of the shards. In some embodiments, the user may request the exemplary data streaming service to increase or decrease the number of shards in the data stream as needed. In some embodiments, the user may be charged on a per-shard basis. A data producer may put data records into shards and a data consumer may retrieve data records from the shards.

In some embodiments, the exemplary data streaming service may include Amazon Kinesis or Apache Kafka, for example.

FIG. 1 is an exemplary computer system 10 of the present disclosure that is configured for adjusting data capacity in a data stream 22 generated from multiple data producing software applications, in accordance with one or more embodiments of the present disclosure. System 10 may include a transmitting data interface (TDI) 15, a data stream communication channel 50, a receiving data interface (TDI) 60, and a computing device 85 for communicating 95 with TDI 15 and/or RDI 60 over any suitable communicating network (not shown). TDI 15 and RDI 60 may be managed by the exemplary data streaming service, and computing device 85 may be managed by a user that uses the exemplary data streaming service. In some embodiments, the user may be an administrator of an enterprise computing system, for example, that manages the data stream to accommodate data generating by each of the plurality of data producing software applications.

In some embodiments, TDI 15 may include a processor 20, an encoder 40, communication circuitry 42, a memory 44, at least one storage device 46, and input and/or output (I/O) devices 48. TDI 15 may generate from data input 12 from the multiple data producing software applications, a sharded data stream 22 which is transmitted over data stream communication channel 50. Encoder 40 may shard the data from data input 12 from the plurality of data producing software applications into data shards in accordance with a data stream mapping (e.g., a first data stream mapping) that may be stored in memory 44 and/or the at least one storage device 46.

In some embodiments, processor 20 may execute software modules such as an input data traffic detection module 25, a data stream management module 30 with a sharding module 35 for managing the sharding of data input 12 based on data stream mappings provided by the user, and for merging and/or splitting shards in the data stream for respectively decreasing and/or increasing data capacity in transmitted sharded data stream 22 upon request by the user. Data stream management module 30 may create and/or update a data stream mapping of data in data input 12 which may be used by encoder 40 write the data in data input 12 to a plurality of data shards for transmission in sharded data stream 22 over data stream communication channel 50. Accordingly, when more data capacity or less data capacity is needed, sharding module 35 may be used to update the data stream mapping relayed to encoder 40.

In some embodiments, RDI 60 may include a processor 65, a decoder 75, communication circuitry 76, a memory 78, at least one storage device 80, and input and/or output (I/O) devices 82. RDI 60 may receive sharded data stream 58 that was transmitted from TDI 15 over data stream communication channel 50. Decoder 75 may receive sharded data stream 58 and may send each shard in received sharded data stream 58 to each of at least one data consumer or intended data recipient.

In some embodiments, processor 65 may execute software modules such as consumer data user monitor 67 for monitoring the data received in sharded data stream 58, and a data management module 70 with a data stream mapping (e.g., a second data stream mapping) of the shards in received data stream 58 for relaying the shards to at least one data consumer (e.g., data recipients). Decoder 75 may use the second data stream mapping in a data output 84 to route each received data shards to each of the intended data consumers or recipients as known by the exemplary data streaming service. In some embodiments, decoder 75 may use routing information such as from data packet headers to know where to route the data shards if the data stream for a predefined data capacity are randomly sharded, and not provisioned for specific data applications.

In some embodiments, computing device 85 of the user may include a processor 90, a memory 87, input and/or output (I/O) devices 88, and communication circuitry 86 for communicating 95 with TDI 15 and/or RDI 60 over a communication network. For example, I/O devices 88 may include a keyboard 98, a mouse 99, and a display 97. A graphic user interface (GUI) 96 may be displayed on display 97. Computing device 85 may be used to communicate 95 data stream commands and/or provisioning requests to TDI 15 and/or RDI 60. The commands and/or requests between computing device 85 and TDI 15 and/or RDI 60 may be entered by the user on GUI 96.

In some embodiments, the commands and/or requests may be in JavaScript Object Notation (JSON) format.

In some embodiments, processor 90 may execute software modules such as a GUI Manager 91 for displaying GUI 96 on display 97, a shard provisioning module (SPM) 92, and a data traffic detection module 94 for receiving data traffic information from TDI 15 and/or RDI 60.

In some embodiments, processor 90 of computing device 85 may be used by a user to execute shard provisioning module 92 for generating a set-up request to the exemplary data streaming service to create a data stream 22 to be transmitted over data stream communication channel 50 with an initial predefined data capacity. The user may specify, at least on part, on GUI 96 as to which shards, if any, to provision from the plurality of data producing software applications, each sending data records to TDI 15 through data input 12. The set-up request may then be communicated 95 to data stream management module 30 to execute the create stream set-up request in TDI 15.

FIGS. 2A-2B are exemplary embodiments for adjusting data capacity in data stream 50 generated from multiple data producing software applications 105, in accordance with one or more embodiments of the present disclosure.

FIG. 2A is a flow diagram 100 illustrating four data producing software applications 105A, 105B, 105C, 105D denoted A, B, C, and D that are input to TDI 15. Note that the processes shown in flow diagram 100 may be performed by TDI 15, RDI 60, and/or computing device 85. In flow diagram 100, the user may send a set-up request to TDI 15 via computing device 85 to create a data stream 22 from data inputs 12 from data producing software applications 105A, 105B, 105C, 105D of an initial data capacity. However, the user has not provisioned any shards to be associated with any of the data producing software applications 105.

As a result, when data records sent from any of the data producing software applications 105 are relayed to data input 12 of TDI 15, encoder 40 may shard the data in any arbitrary or random manner, which are transmitted in transmitted data stream 22 over data stream communication channel 50 as shards 115. Sharded data stream 58 may be received by RDI 60 at the receiving end of data stream communication channel 50. Subsequently, the data records in the received shards may be relayed to their intended data recipients such as software solutions provided by Splunk, Inc. (San Francisco, Calif.), Elasticsearch (R) (Elasticsearch BV, Mountain View, Calif.), and/or Apache Hadoop™ (The Apache Software Foundation, Wakefield, Mass., and other software suits and applications.

However, in the exemplary configuration shown in flow diagram 100, if one of the data producing software applications suddenly generates more data and thus, needs more data capacity, the overall data capacity of all of the shards in transmitted data stream 22 may be too low on the data pipeline resulting in a queuing bottleneck of the data into transmitted data stream 22 on data stream communication channel 50 for the data producing software applications. This may result in a poor quality of service and/or latency issues for some or all of the data producing software applications.

In some embodiments, the user may identify that data producing software application 105A, 105B, 105C, 105D may need a fixed data capacity. Since data shards are of a fixed data capacity, shard provisioning module 92 may be assign a number of data shards to any or all of the data producing software applications 105. In this manner, enough data capacity on the data stream may be locked or reserved for a given data producing software application from the plurality of data producing software applications.

FIG. 2B is a flow diagram 120 illustrating four data producing software applications 105A, 105B, 105C, 105D generating data 12 that is input to TDI 15. However, SPM 92 may be used to generate a first data mapping on the generated data 12 from each data producing software application (e.g., 105A, 105B, 105C, 105D) into shards 115 in transmitted data stream 22 on data stream communication channel 50.

For example, the first data mapping may map data records from data producing software application 105A to shard 115A, data producing software application 105B to shard 115B, data producing software application 105C to shard 115C, and data producing software application 105D to shard 115D in transmitted data stream 22. Thus, as shown in FIG. 2B, data stream 22 transmitted into data stream communication channel 50 may include assigning shard 115A, 115B, 115C, and 115D respectively to data producing software applications 105A, 105B, 105C, 105D, and shard 115, which remain unreserved for any other unassigned data producing software applications, if any. The total number of number of shards allocated to the data stream, whether the shards are assigned or unassigned, fixes the data capacity of the data stream, and also determines the price by the exemplary data streaming service for the user.

Figure 3:
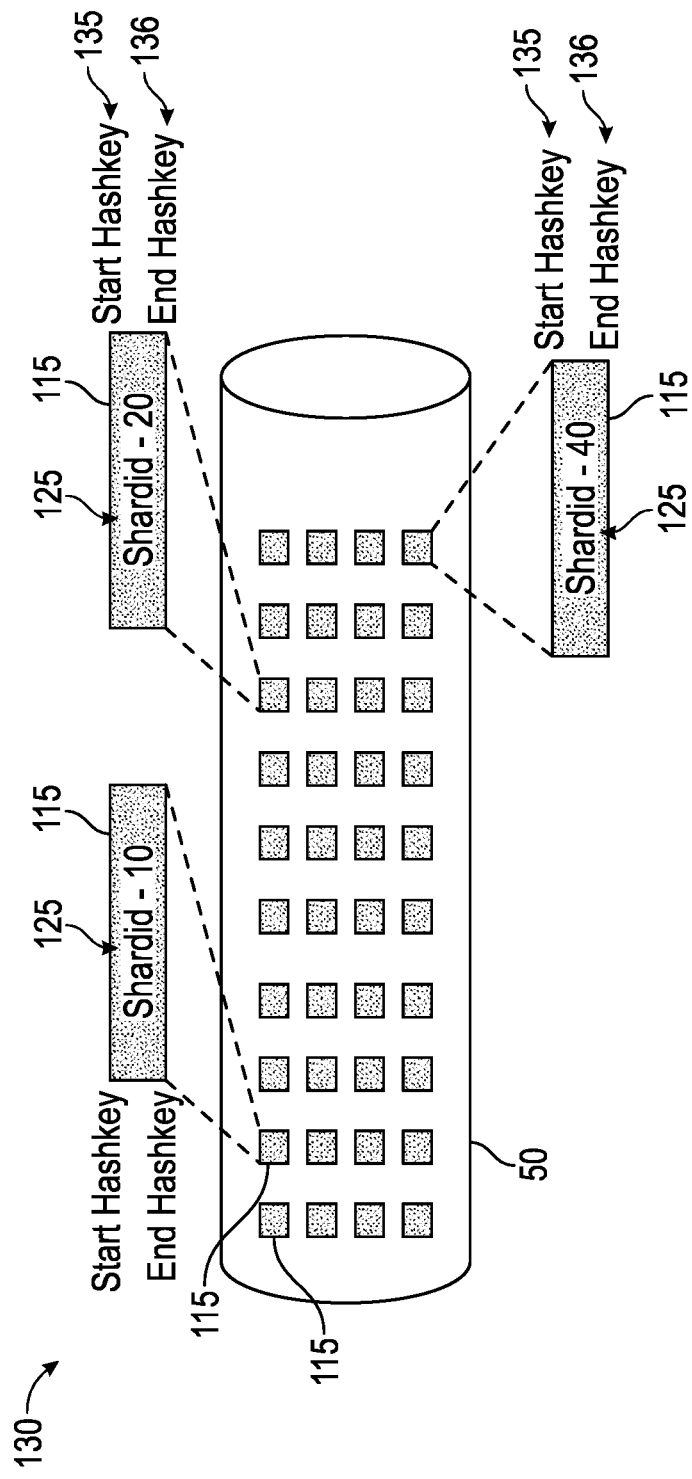
FIG. 3 illustrates shards in a data stream with a shard identification (ID) number and hash key range, in accordance with one or more embodiments of the present disclosure.

FIG. 3 illustrates shards in a data stream with a shard identification (ID) number and hash key range, in accordance with one or more embodiments of the present disclosure. When SPM 92 sends a set-up request by the user to provision the shards in the data stream to data stream management module 30 in TDI 15, data stream management module 30 may send to SPM 92, information about how to access the shards in the data stream. First, each shard in the data stream may be referenced by data producing software applications 105 by a Shard identification number 125 (ShardID) such as Shardid-10, Shardid-20, and Shardid-40, for example. Additionally, and/or optionally, each shard may be referenced by data producing software applications 105 using a hashkey number. The shardID and/or the hashkey numbers allows a given application to fix which specific shard to write data on the transmit side of data stream communication channel 50 and to read data from the specific shard on the receive side of data stream communication channel 50. Each shard has a start hashkey 135 and an end hashkey 136. Hashkey values for a data stream as provided by the exemplary data streaming service may be in the range of 0 to $2^{128}$.

In some embodiments, the user may be aware that during specific time intervals, more data capacity may be needed for at least one particular data producing software application. In that case, the user may send a new update request from SPM 92 to data stream management module 30 in TDI 15 to increase the number of shards assigned to the at least one particular data producing software application.

In some embodiments, increasing the number of shards may be performed by splitting one parent shard assigned to the at least one data producing software application into two child shards. In other embodiments, the parent shard has a specific range of hashkeys associated with the parent shard: start parent hashkey and an end parent hashkey of the parent shard. When splitting the shard, a third hashkey within the specific hashkey range of the parent shard is used. After splitting the parent shard, two child shards are adjacent. Stated differently, the specific hashkey range of the first child shard is the start parent hashkey to the third hashkey-1, and the specific hashkey range of the second child shard is the third hashkey to the end parent hashkey. This process will be further explained in FIGS. 4A-4B hereinbelow.

In some embodiments, the user may be aware that during specific time intervals, less data capacity may be needed for at least one particular data producing software application. In that case, the user may send a new update request from SPM 92 to data stream management module 30 in TDI 15 to decrease the number of shards assigned to the at least one particular data producing software application. In some embodiments, decreasing the number of shards may be performed by merging two parent shards assigned to the at least one data producing software application into one child shard. In other embodiments, the two parent shards are two adjacent parent shards, where the end hashkey of the first parent shard and the start hashkey of the second parent shard are contiguous.

Figure 4A:
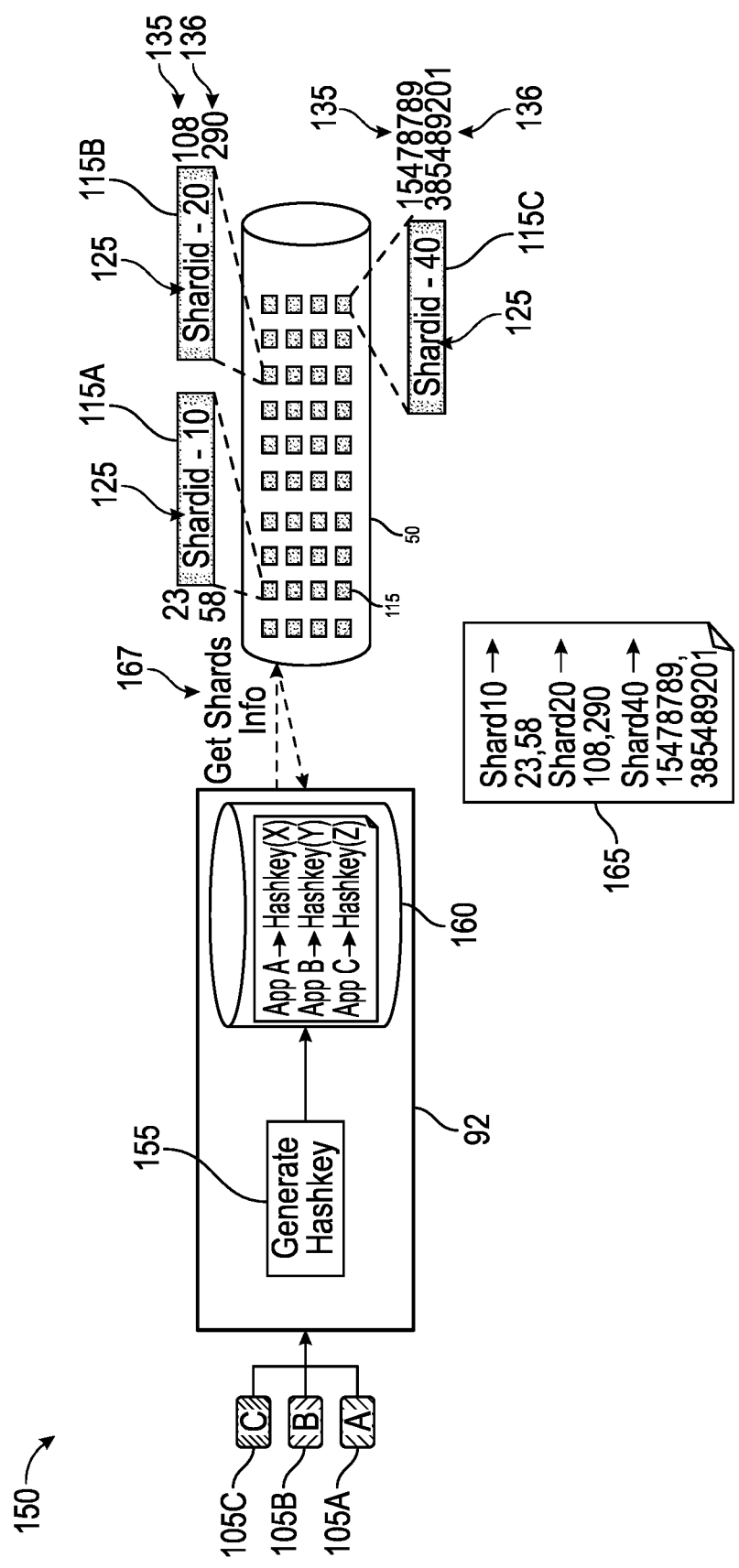
FIGS. 4A-4B illustrates updating a data stream mapping of the data input into the plurality of data shards, in accordance with one or more embodiments of the present disclosure.
Figure 4B:
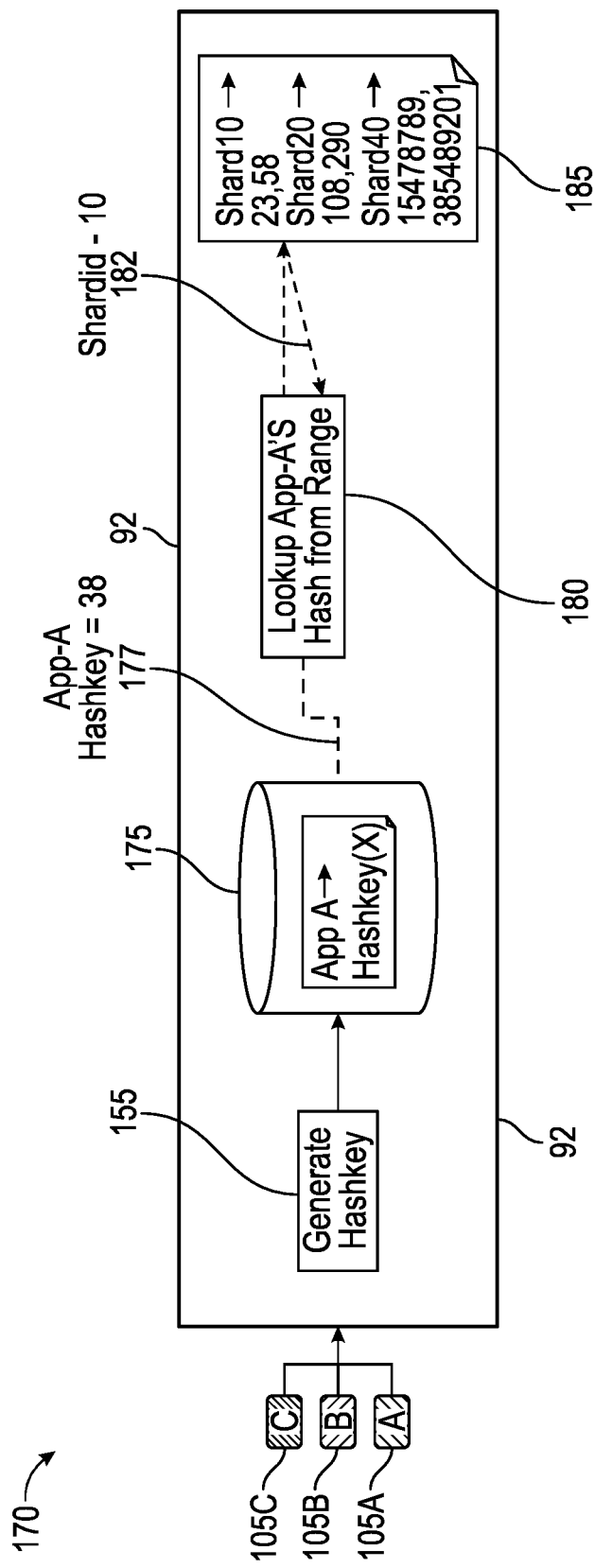

FIGS. 4A-4B illustrates updating a data stream mapping of the data input into the plurality of data shards, in accordance with one or more embodiments of the present disclosure.

FIG. 4A is a flow diagram 150 illustrating three data producing software applications 105A, 105B, 105C generating data that is input to TDI 15 in a sharded data stream, where shards are previously assigned to each of the three data producing software applications in accordance with a (first) data stream mapping 165. Data stream mapping file 165 may be stored in memory 87 and/or in memory 44. In this example, shardid 10 with start hashkey 23 and end hashkey 58 may be assigned to data producing software application (APP) A 105A, shardid 20 with start hashkey 108 and end hashkey 290 may be assigned to data producing software application (APP) B 105B, and shardid 40 with start hashkey 15478789 and end hashkey 385489201 may be assigned to data producing software application (APP) C 105C.

In some embodiments, in order to send data records from a specific data producing software application, TDI 15 may generate a specific hashkey with a specific hashkey range associated with a specific shard assigned to the specific data producing software application. TDI 15 may relay the specific hashkey and/or the shardid of the specific shard to the specific data producing software application. The specific data producing software application may write data records to the specific shard using the specific hashkey.

In some embodiments, shard provisioning module (SPM) 92 executed by processor 90 of user computing device 85 may include a function 160 relating the shardID for each shard to the shard start hashkey and end hashkey for each shard, and to which specific data producing software application each shard is assigned. SPM 92 may generate a hashkey 155 for an application using the shardID as an input to function 160 from a specific hashkey range associated with a specific shard assigned to the specific data producing software application. SPM 92 may get shard information 167 from TDI 15. The specific data producing software application may write data records to the specific shard using the specific hashkey.

FIG. 4B is a flow diagram 170 illustrating three data producing software applications 105A, 105B, 105C generating data that is input to TDI 15 in a sharded data stream. However, the user may determine that data producing software application 105A does not have enough data capacity. The user through GUI 96 may enter a request for more data capacity by requesting more shards to be assigned to data producing software application 105A. In this case, SPM 92 generates hashkey 155 which is relayed to function 175. Function 175 associates 182 Shard10 with start/end hashkey range of 23 to 58 upon looking up 180 this range for data producing software application 105A using data stream mapping file 185. SPM 92 identifies 177 a hash key of 38 within this range to be used to split shard 10.

In some embodiments, SPM 92 then updates data stream mapping file 185 with two new child shards in place of parent shard (e.g., Shard10), the first child shard having a start hashkey of 23 and an end hashkey of 37, and the second child shard having a start hashkey of 38 and an end hashkey of 58. SPM 92 may assign the two adjacent child shards new shardID such as Shard41 and Shard42, for example.

In some embodiments, function 160 and/or function 175 may include an MD5 hash function, for example.

In some embodiments, SPM 92 may then relay data stream mapping file 185 after being updated to TDI 15 and/or the child shard hashkeys and/or the child shard shardIDs. TDI 15 may deactivate Shard10 and may activate adjacent child shards Shard41 and Shard42 in this example.

In some embodiments, SPM 92 may similarly reduce data capacity for data producing software application 105A by merging two adjacent shards with contiguous hashkey ranges as previously described and assigning a new ShardID to the single child shard after merging. SPM 92 may then relay data stream mapping file 185 to TDI 15 after being updated with the merged shard and/or the child shard hashkeys and/or the child shard shardIDs. After merging two parent shards, TDI 15 may deactivate the ShardID of the two parent shards and activate a new ShardID of the single child shard.

Note that the embodiments described in FIGS. 2-4 are merely for conceptual clarity and not by way of limitation of the embodiments disclosed herein. A plurality of shards in transmitted data stream 22 may be assigned to a respective plurality of data producing software applications, such as a thousand or ten thousand data producing software applications.

In some embodiments, SPM 92 (e.g., processor 90) may receive an update request by a user over GUI 96 to add more data capacity for at least one data producing software application over at least one predefined time interval. SPM 92 may add more data capacity for the at least one data producing software application over at least one predefined time interval in response to the update request by the user by increasing the number of data shards. SPM 92 may then reduce the number of the data shards in the data stream assigned to the at least one data producing software application after the at least one predefined time interval.

In some embodiments, data traffic detection module 94 (e.g., processor 90) may receive in real-time, from input data traffic detection module 25 of TDI 15 in communicating 95 over a communication network with user computing device 85, data traffic in data input 12 for each of the plurality of data producing software applications. Similarly, data traffic detection module 94 (e.g., processor 90) may receive in real-time, from consumer data user monitor 67 of RDI 60 in communicating 95 over a communication network with user computing device 85, data traffic in data output 84 to each of the plurality of data recipients or intended data consumer applications.

In some embodiments, GUI manager 91 (e.g., processor 90) may output in real-time, the data traffic in the data input for each of the plurality of data producing software applications on GUI 96 to the user. Similarly, GUI manager 91 (e.g., processor 90) may output in real-time, data traffic in data output 84 to each of the plurality of data recipients or data consumer applications on GUI 96 to the user.

In some embodiments, SPM 92 (e.g., processor 90) may adjust the data capacity for the at least one data producing software application by automatically adding more data capacity for the at least one data producing software application when the detected data traffic for the at least one data producing software application increases above a predefined threshold. SPM 92 may automatically increase the number of data shards.

In some embodiments, SPM 92 (e.g., processor 90) may automatically reduce the added data capacity for the at least one data producing software application when the detected data traffic for the at least one data producing software application falls below the predefined threshold. SPM 92 may automatically reduce the added data capacity for the at least one data producing software application by decreasing the number of data shards in the data stream assigned to the at least one data producing software application.

In some embodiments, SPM 92 may be used to initially request TDI 15 to create a data stream (e.g., a new data stream). SPM 92 may receive from TDI 15 shardID and/or the start/end hashkeys for each of the shards assigned to any new applications designated in the set-up request, and/or unassigned shards, which are automatically assigned by sharding module 35 on TDI 15 in response to the set-up request. Sharding module 35 on TDI 15 may relay shardID and/or start/end hashkeys for each of the shards in the created data stream to SPM 92 as an initial data stream mapping.

Figure 5:
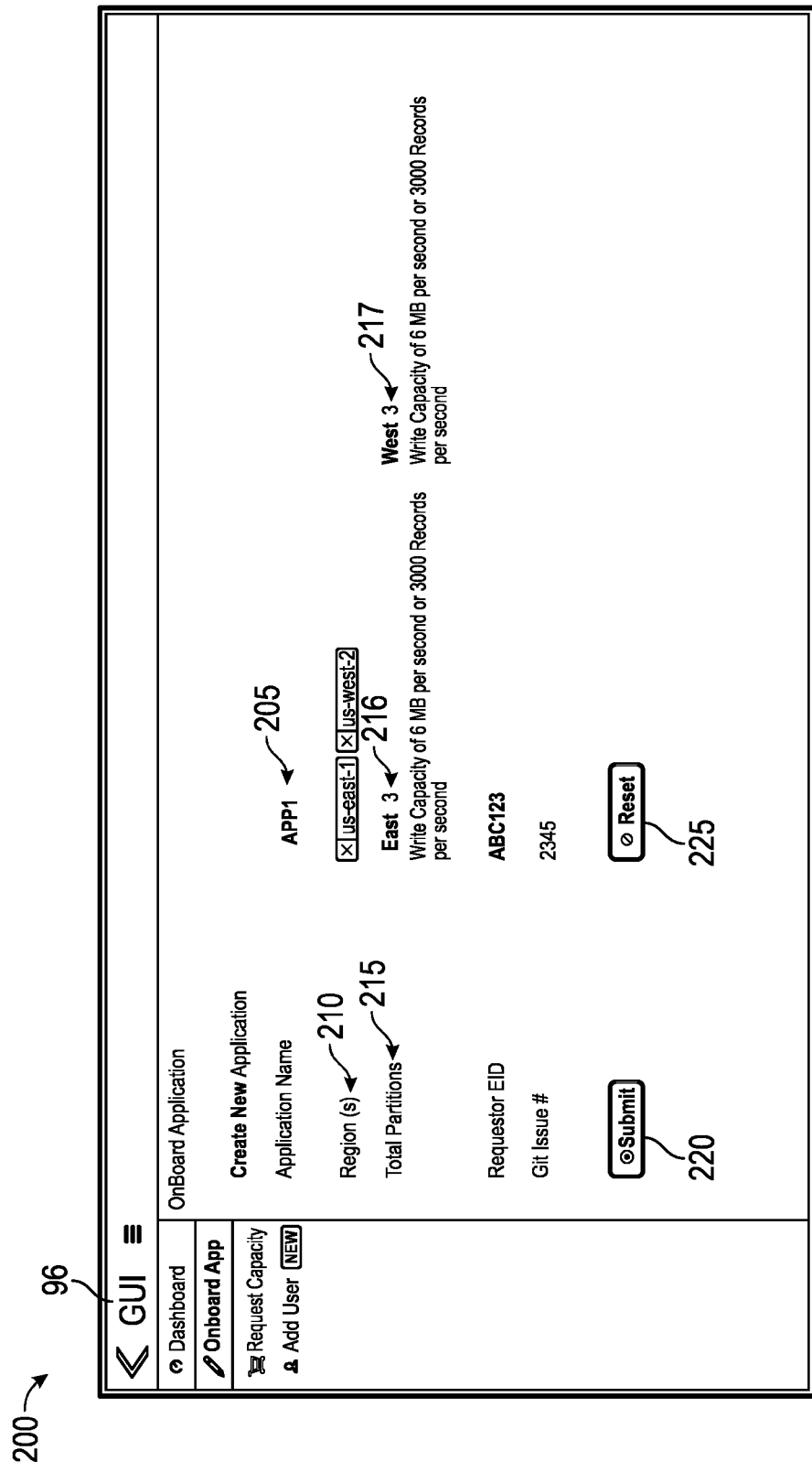
FIG. 5 is a first exemplary view of a graphic user interface defining data capacity in a data stream for a new data producing software application, in accordance with one or more embodiments of the present disclosure.

FIG. 5 is a first exemplary view 200 of graphic user interface 96 for defining data capacity in a data stream for a new data producing software application, in accordance with one or more embodiments of the present disclosure. Processor 90 through GUI manager 91 may display the first exemplary view 200 of GUI 96 on display 97. First exemplary view 200 may display a form page for adding a new (data producing) application as a data input to an existing data stream. The user may enter an application name 205 such APP1 into the data field, at least one data stream region 210 such as us-east-1 and us-west-2, for example. The user may then enter the total number of partitions 215 or total number of shards to add to the existing stream. First exemplary view 200 may allow the user to enter the number of partitions for each region such as 3 shards for East 216 and 3 shards for west 217.

Once the form page is entered, the user may press a SUBMIT button 220 to submit the data in the data fields on GUI 96, or press a RESET button 225 for to clear the data fields. SPM 92 may then relay the user-entered information in the form page to TDI 15. In response, data stream management module 30 may process the new application request and assign 6 shards for APP1 to use in data stream 22 transmitted over data stream communication channel 50.

In some embodiments, data stream management module 30 may then send to SPM 92, a confirmation of the updated data stream mapping of data input 12 into 6 data shards for data producing software application APP1 for transmission in a data stream 22 over data stream communication channel 50 from TDI 15 to RDI 60 of the exemplary data streaming service. The existing data stream mapping may be updated in SPM 92 with the shardID and/or the start/end hashkeys for each of the new shards assigned to APP1.

Figure 6:
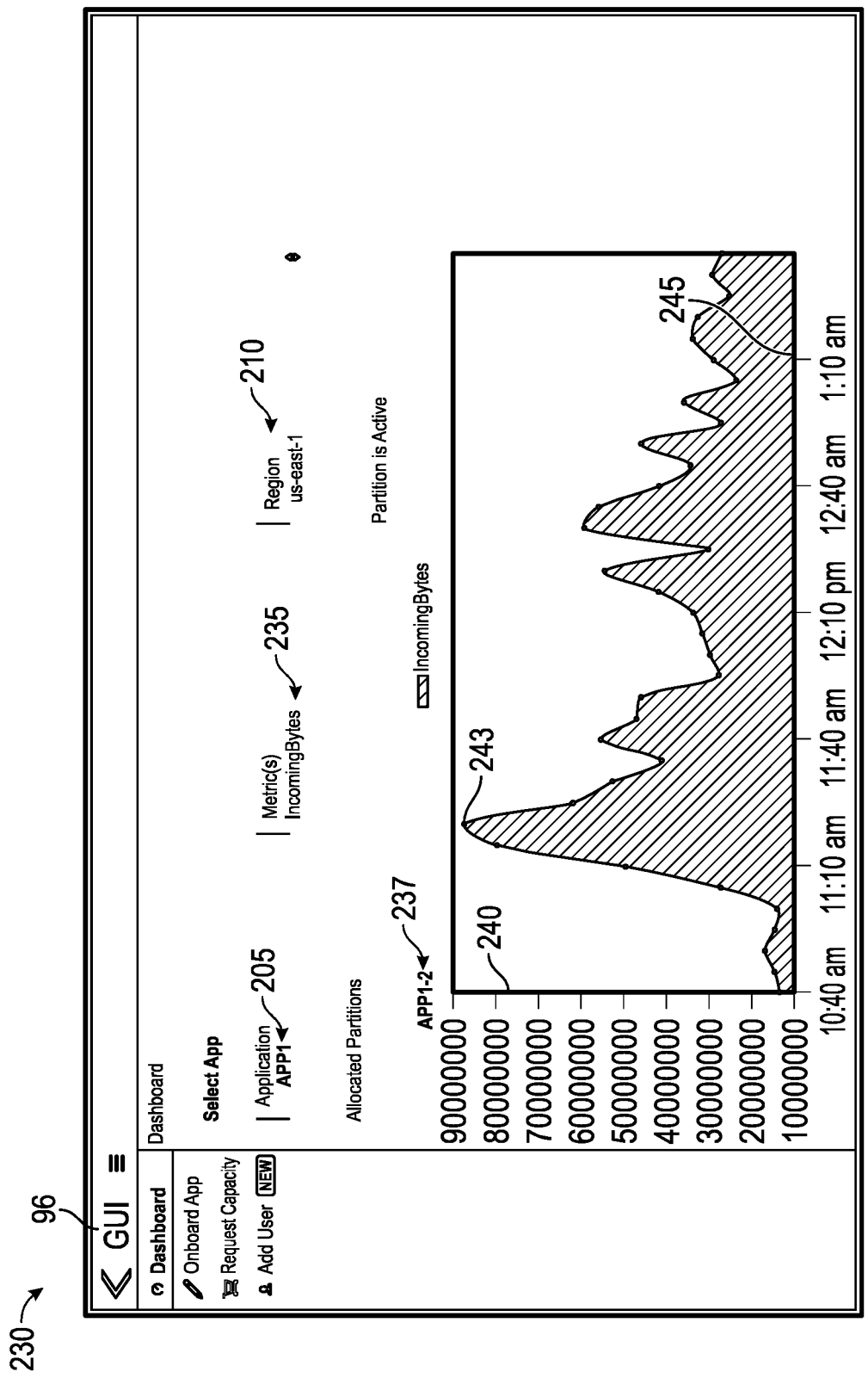
FIG. 6 is a second exemplary view of a graphic user interface of a graph showing incoming data from a data producing software application, in accordance with one or more embodiments of the present disclosure.

FIG. 6 is a second exemplary view 230 of graphic user interface 96 of a graph showing incoming data from a data producing software application, in accordance with one or more embodiments of the present disclosure. Second exemplary view 230 illustrates a graph of a metric 235 chosen by the user on GUI 96 which is the number of incoming bytes of shard "APP1-2" of the six shards for APP1. The graph displays on Y-axis 240 the number of bytes in shard "APP1-2" versus time 245 on the x-axis. Note that there is a peak 243 in input data traffic in APP1 from 1.5 MB to 8.8 MB for this shard. Thus, at the time intervals around peak 243, more capacity may be needed.

Figure 7:
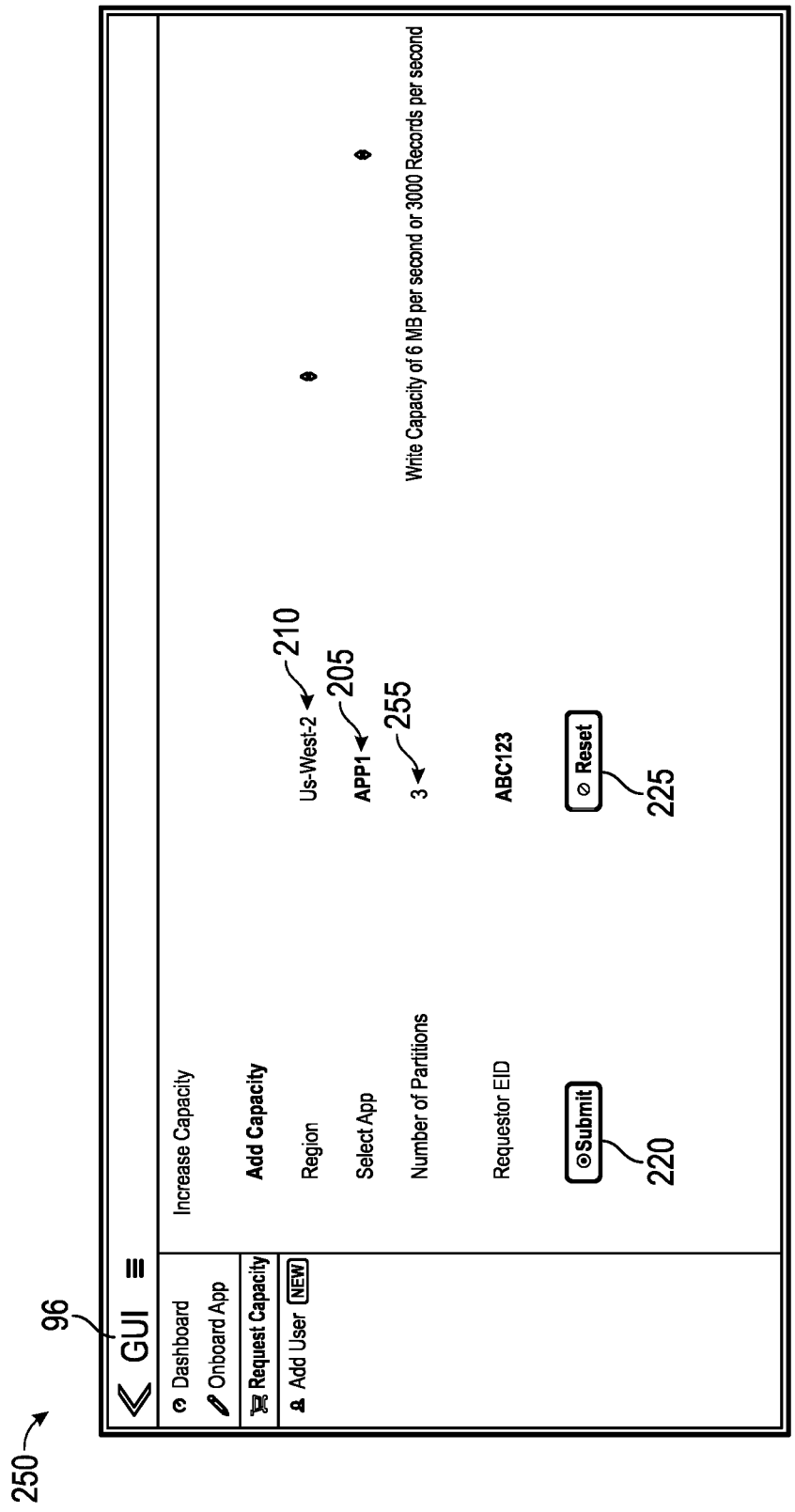
FIG. 7 is third exemplary view of a graphic user interface for adding more capacity in the data stream for a data producing software application, in accordance with one or more embodiments of the present disclosure.

FIG. 7 is third exemplary view 250 of graphic user interface 96 for adding more capacity in the data stream for a data producing software application, in accordance with one or more embodiments of the present disclosure. Third exemplary view 250 should a form page displayed on GUI 96 allowing the user to increase the data capacity by entering a number of partitions 255 to be added for APP1 (e.g., 3 new shards) in region 210 of US-West-2.

When the user pressed SUBMIT button 220, SPM 92 may generate an updated data stream mapping file with information that includes, in part, the shardIDs of the three parent shards to split as well as the start/end hashkeys for each of the child shards assigned to APP1. SPM 92 may communicate 95 the updated data stream mapping file in a request to sharding module 35 in data stream management module 30 of TDI 15 to increase the number of shards for APP1. In response to the request, data stream management module 30 may communicate 95 a confirmation indication to SPM 92 that the parent shardIDs are deactivated and the split child shardIDs are activated with the start/end hashkeys designated in the updated data stream mapping file of the request.

In some embodiments, GUI 96 may include a time interval (not shown) over which the added capacity is valid such as the time interval around peak 243. After that, SPM 92 may automatically remove the added 3 shards for APP1.

In some embodiments, SPM 92 may use 6 MB as a predefined threshold to automatically trigger SPM 92 to add three more shards to accommodate peak 243, for example.

Figure 8:
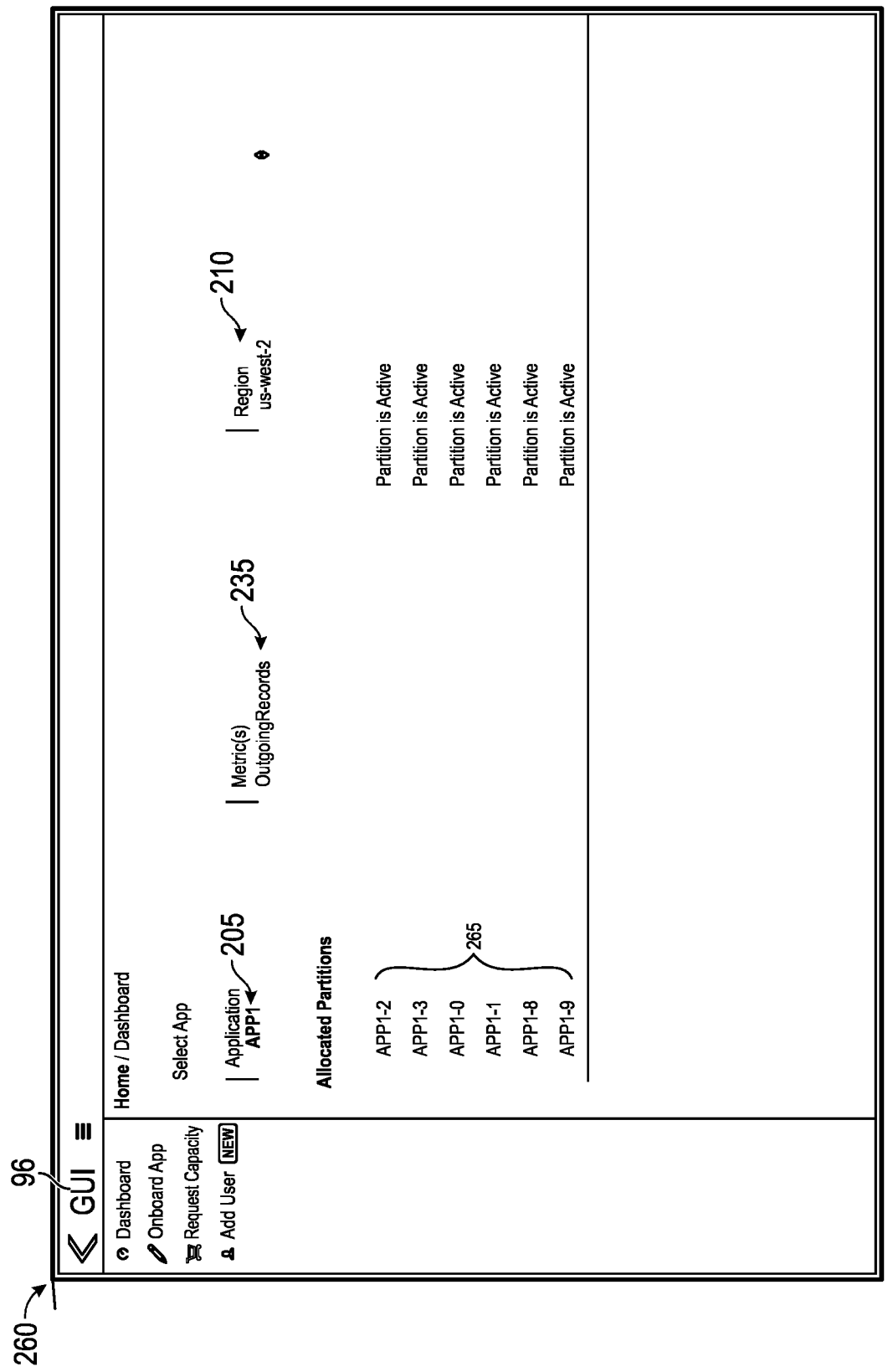
FIG. 8 is fourth exemplary view of a graphic user interface of a dashboard showing the allocated shards for a data producing software application, in accordance with one or more embodiments of the present disclosure.

FIG. 8 is a fourth exemplary view 260 of graphic user interface 96 of a dashboard showing the allocated shards for a data producing software application, in accordance with one or more embodiments of the present disclosure. Fourth exemplary view 260 of the dashboard now indicates to the user that active allocated partitions 265 (e.g., shardIDs) for application APP1 may include APP1-2, APP1-2, APP1-0, APP1-1, APP1-8, and APP1-9. If the user selects metric 235—Outgoing Record and clicks on APP1-2, the graph shown in FIG. 9 opens.

Figure 9:
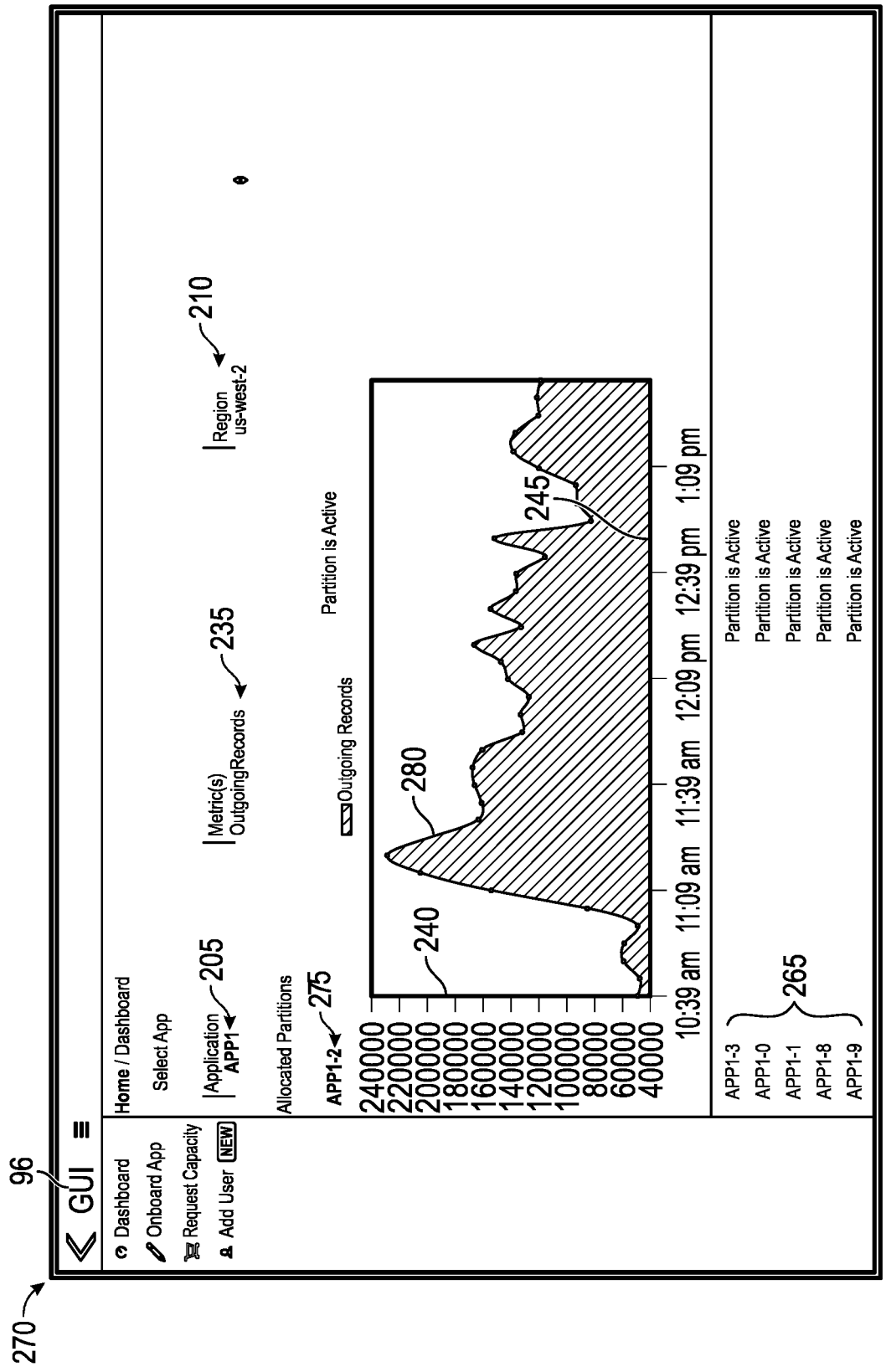
FIG. 9 is fifth exemplary view of a graphic user interface showing the outgoing records of one allocated shard for a data producing software application, in accordance with one or more embodiments of the present disclosure.

FIG. 9 is fifth exemplary view 270 of graphic user interface 96 showing the outgoing records of one allocated shard for a data producing software application, in accordance with one or more embodiments of the present disclosure. Fifth exemplary view 270 shows a graph of the number of outgoing records, or number of bytes received, as monitored by consumer data user monitor 67 of RDI 60 showing the data for APP1 in received sharded data stream 58 for the shard with shardID APP1-2. The graph shows a peak 280 in outgoing data records occurring substantially at the same time as peak 243 in FIG. 6.

The exemplary views of GUI 96 shown in FIGS. 5-9 for managing a data stream are for visual clarity and not by way of limitation of the embodiments of the disclosed invention. For example, GUI 96 may be configured to display a form page to the user (not shown in FIGS. 5-9) for generating a request to TDI 15 to merge shards as previously described hereinabove.

Figure 10:
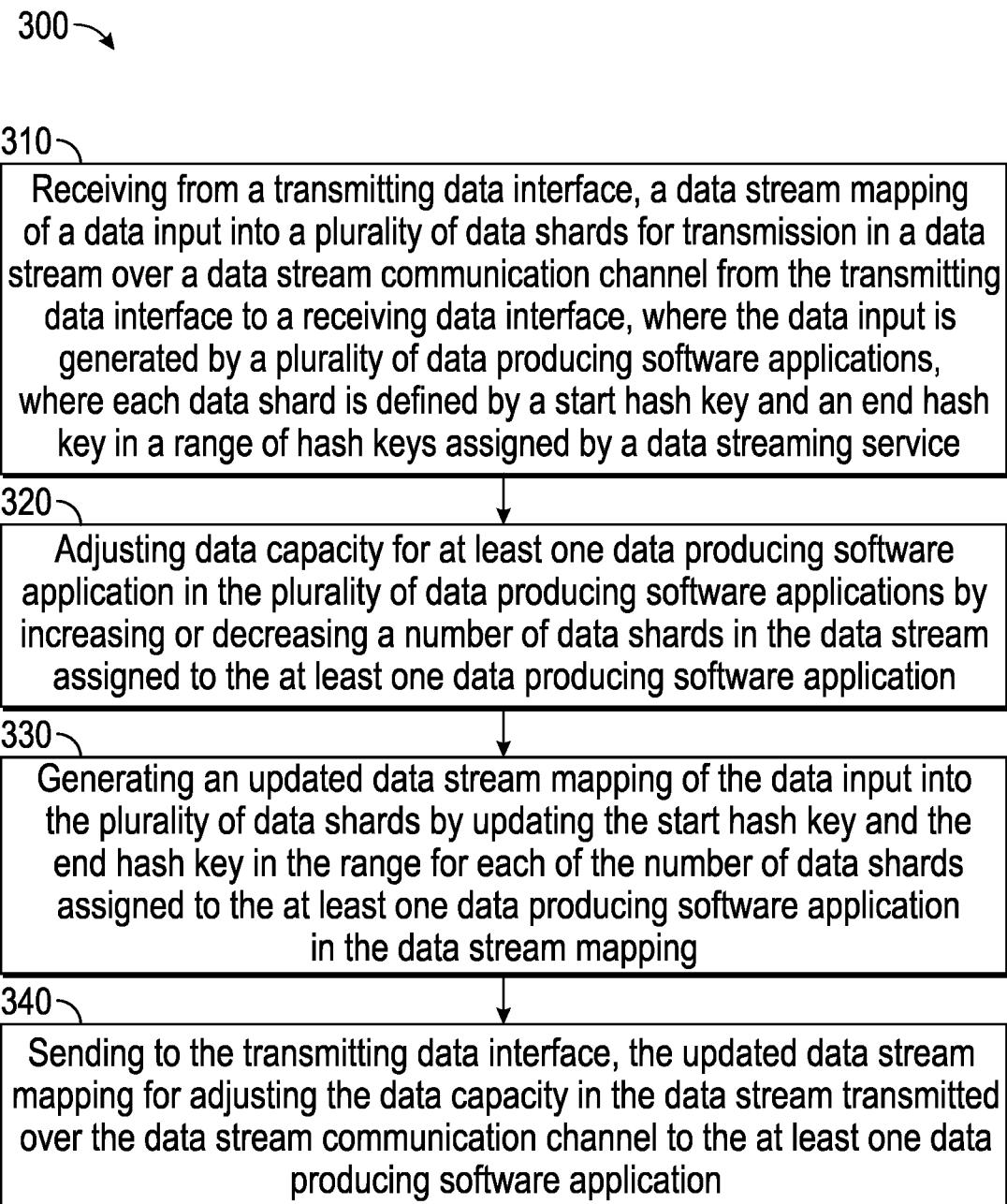
FIG. 10 is a flowchart of a method for adjusting data capacity in a data stream generated from multiple data producing software applications, in accordance with one or more embodiments of the present disclosure.

FIG. 10 is a flowchart of a method 300 for adjusting data capacity in a data stream generated from multiple data producing software applications, in accordance with one or more embodiments of the present disclosure. Method 300 may be performed by processor 90.

Method 300 may include receiving 310 from transmitting data interface 15, data stream mapping 160 of a data input into a plurality of data shards for transmission 22 in a data stream over data stream communication channel 50 from transmitting data interface 15 to receiving data interface 60, where the data input is generated by a plurality of data producing software applications 105, where each data shard 115 is defined by start hash key 135 and end hash key 136 in a range of hash keys assigned by a data streaming service. Additionally, and/or optionally, each data shard may be defined by a unique shard identification designator (e.g., ShardID, or ShardID number).

Method 300 may include adjusting 320 data capacity for at least one data producing software application in the plurality of data producing software applications 105 by increasing or decreasing a number of data shards in the data stream assigned to the at least one data producing software application.

Method 300 may include generating 330 updated data stream mapping 185 of the data input into the plurality of data shards 115 by updating start hash key 135 and end hash key 136 in the range for each of the number of data shards 115 assigned to the at least one data producing software application in the data stream mapping.

Method 300 may include sending 340 to transmitting data interface 15, updated data stream mapping 185 for adjusting the data capacity in the data stream transmitted over data stream communication channel 50 to the at least one data producing software application.

In an enterprise that may process data on the order of 100 TB per day, efficiently processing data in a streaming platform may pose challenges for the enterprise in terms administrative processing, resource provisioning, and/or technology constraints that may limit enterprise teams to plan operations at the data stream level without the granularity level of managing multiple data producers using a data stream. These granularity levels of data sub-units may be, but not limited to shards in Amazon Kinesis, or partitions on Apache Kafka, for example.

The embodiments disclosed herein solve these technical problems by providing these granular services in a data stream. A user may provision and/or allocate sub-units of data within a data stream like shards or partitions for use by multiple data producers in the enterprise, manually and/or dynamically scale them according to the data capacity needed for each of the multiple data producers, and monitor the sub-units in terms of performance and/or data capacity. An enterprise, in particular, having this granular capability of managing and adjusting the data sub-units according the needs of the data producers, significantly reduces administrative overhead and increases overall computing efficiency within the enterprise computing systems disclosed herein.

Furthermore, if there are 20 teams in an organization, for example, each team may have its own data stream and thus, pay the data streaming service for 20 separate data streams. Using the embodiments disclosed herein, SPM 92 may manage the data producing software applications from the 20 teams for use over one data stream and dynamically vary the data capacity over time for each of the data producing software applications for each of the 20 teams. The embodiments taught herein are not limited to an enterprise computing system but may be applied to any computing system as well.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RCS, CAST and Skipjack), cryptographic hash algorithms (e.g., MD5, RIP-EMD-160, RTR0, SHA-1, SHA-2, Tiger (TTH), WHIRLPOOL, RNGs). The aforementioned examples are, of course, illustrative and not restrictive.

As used herein, the term "user" shall have a meaning of at least one user.

Figure 11:
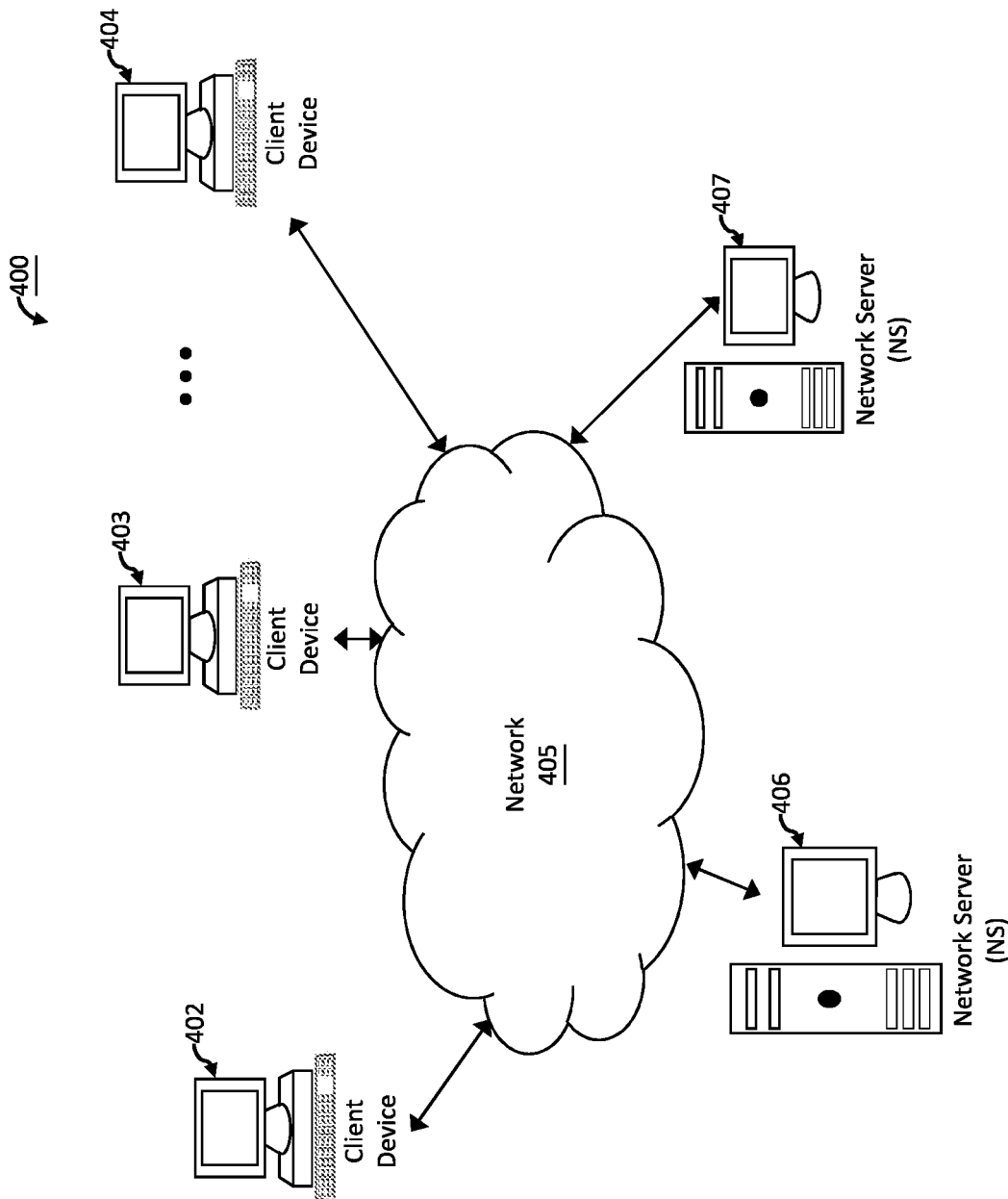
FIG. 11 depicts a block diagram of an exemplary computer-based system/platform in accordance with one or more embodiments of the present disclosure.

FIG. 11 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 11, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 11, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 12:
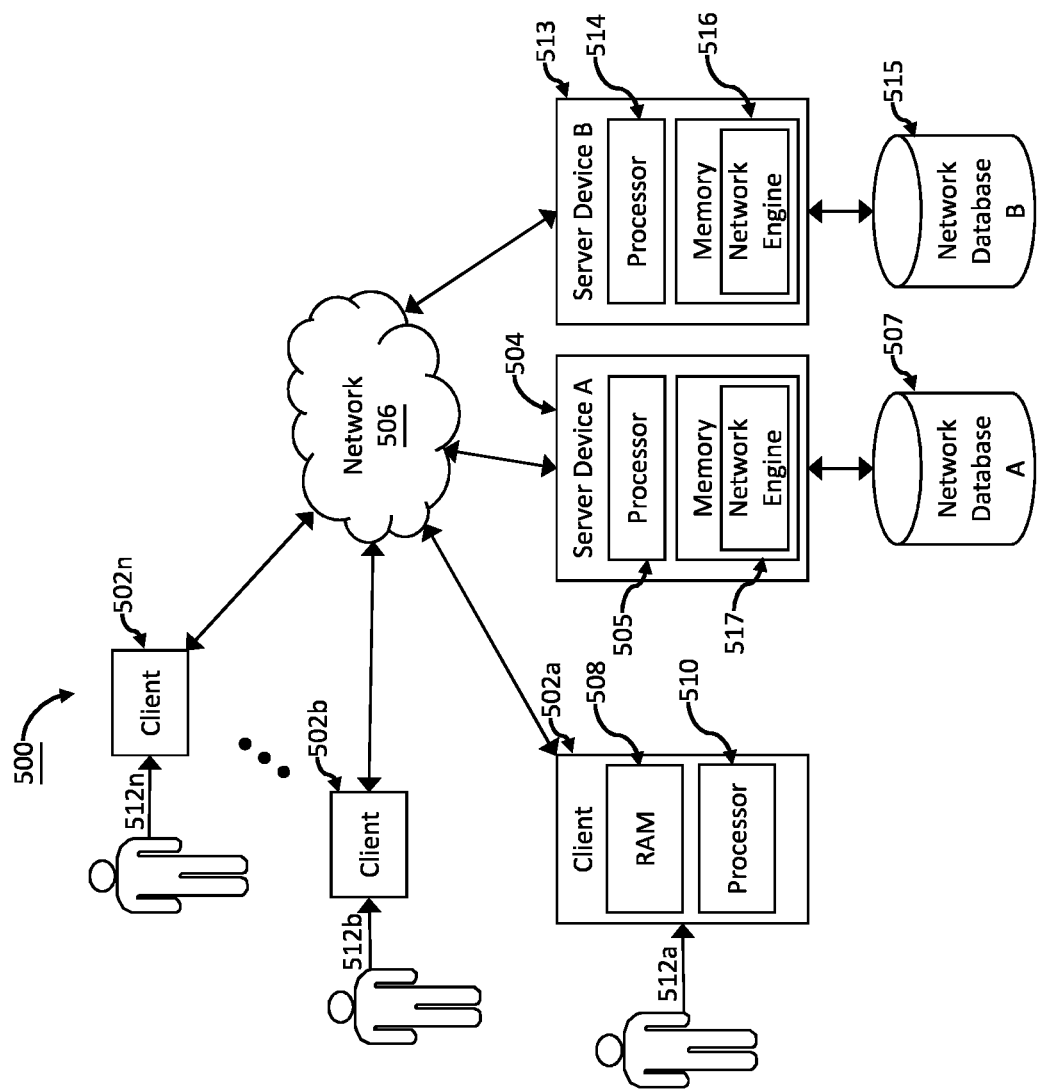
FIG. 12 depicts a block diagram of another exemplary computer-based system/platform in accordance with one or more embodiments of the present disclosure.

FIG. 12 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 10, exemplary server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 13:
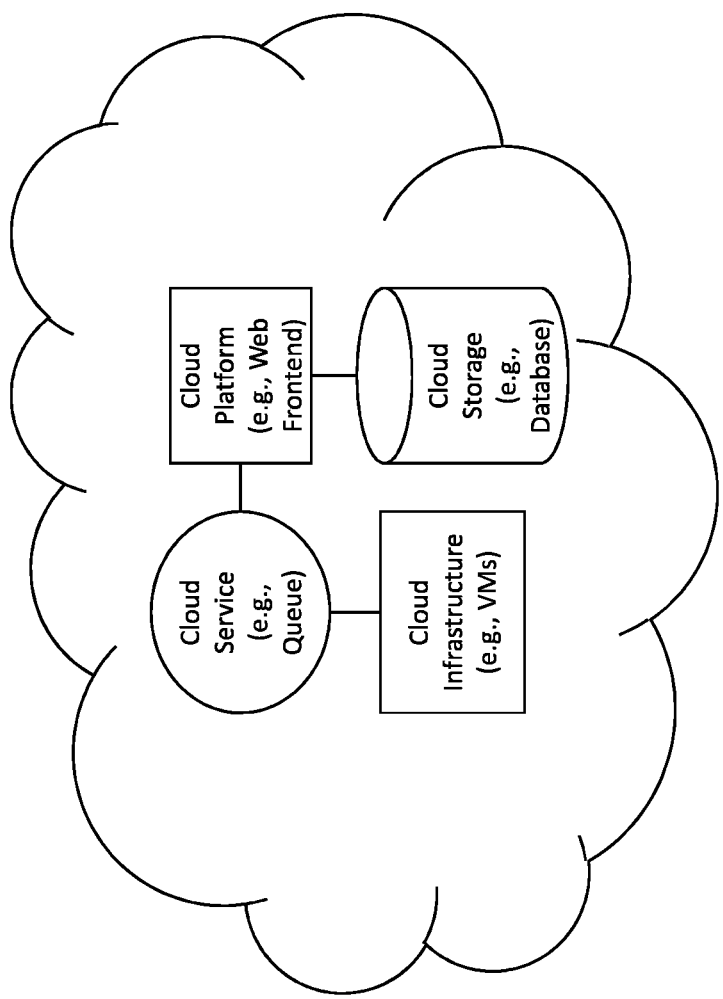
FIGS. 13 and 14 are diagrams illustrating implementations of cloud computing architecture/aspects with respect to which the disclosed technology may be specifically configured to operate, in accordance with one or more embodiments of the present disclosure.
Figure 14:
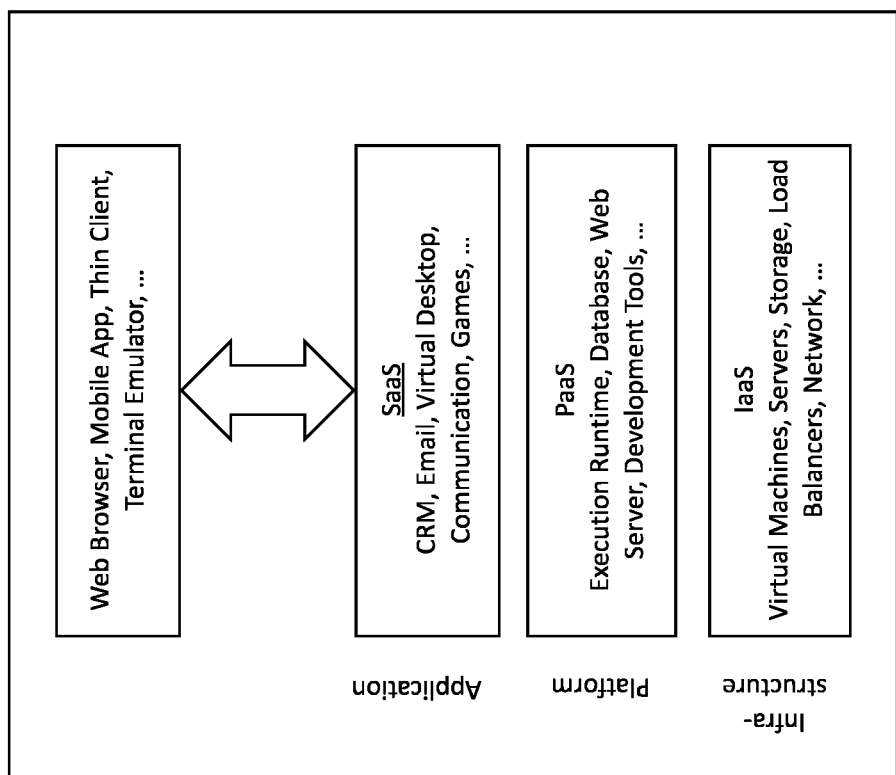

In some embodiments, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS), platform as a service (PaaS), and/or software as a service (SaaS). FIGS. 13 and 14 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

At least some aspects of the present disclosure will now be described with reference to the following numbered clauses.

1. A method, comprising:
receiving, by a processor, from a transmitting data interface, a data stream mapping of a data input into a plurality of data shards for transmission in a data stream over a data stream communication channel from the transmitting data interface to a receiving data interface;
wherein the data input is generated by a plurality of data producing software applications;
wherein the transmitting data interface and the receiving data interface are managed by a data streaming service;
wherein each data shard is defined by a start hash key and an end hash key in a range of hash keys assigned by the data streaming service;
adjusting, by the processor, data capacity for at least one data producing software application in the plurality of data producing software applications by increasing or decreasing a number of data shards in the data stream assigned to the at least one data producing software application;
generating, by the processor, an updated data stream mapping of the data input into the plurality of data shards by updating the start hash key and the end hash key in the range for each of the number of data shards assigned to the at least one data producing software application in the data stream mapping; and
sending, by the processor, to the transmitting data interface, the updated data stream mapping for adjusting the data capacity in the data stream transmitted over the data stream communication channel for the at least one data producing software application.

2. The method according to clause 1, further comprising receiving, by the processor, an update request by a user to add more data capacity for the at least one data producing software application over at least one predefined time interval from a graphic user interface coupled to the processor.

3. The method according to clause 2, wherein adjusting the data capacity for the at least one data producing software application comprises adding more data capacity for the at least one data producing software application over at least one predefined time interval in response to the update request by the user by increasing the number of data shards.

4. The method according to clause 3, further comprising reducing, by the processor, the number of the data shards in the data stream assigned to the at least one data producing software application after the at least one predefined time interval.

5. The method according to clause 1, wherein the data streaming service comprises Amazon Kinesis or Apache Kafka.

6. The method according to clause 1, further comprising receiving in real-time, by the processor, from the transmitting data interface, data traffic in the data input for each of the plurality of data producing software applications.

7. The method according to clause 6, further comprising outputting in real-time, by the processor, the data traffic in the data input for each of the plurality of data producing software applications on a graphic user interface.

8. The method according to clause 6, wherein adjusting the data capacity for the at least one data producing software application comprises dynamically adding more data capacity for the at least one data producing software application when the data traffic for the at least one data producing software application increases above a predefined threshold by increasing the number of data shards.

9. The method according to clause 8, further comprising dynamically reducing, by the processor, the added data capacity for the at least one data producing software application when the data traffic for the at least one data producing software application falls below the predefined threshold.

10. The method according to clause 9, wherein dynamically reducing the added data capacity for the at least one data producing software application comprises decreasing the number of data shards in the data stream assigned to the at least one data producing software application.

11. A system, comprising:
a memory; and
at least one processor configured to execute code stored in the memory that causes the at least one processor to:
receive from a transmitting data interface, a data stream mapping of a data input into a plurality of data shards for transmission in a data stream over a data stream communication channel from the transmitting data interface to a receiving data interface;
wherein the data input is generated by a plurality of data producing software applications;
wherein the transmitting data interface and the receiving data interface are managed by a data streaming service;
wherein each data shard is defined by a start hash key and an end hash key in a range of hash keys assigned by the data streaming service;
adjust data capacity for at least one data producing software application in the plurality of data producing software applications by increasing or decreasing a number of data shards in the data stream assigned to the at least one data producing software application;
generate an updated data stream mapping of the data input into the plurality of data shards by updating the start hash key and the end hash key in the range for each of the number of data shards assigned to the at least one data producing software application in the data stream mapping; and
send to the transmitting data interface, the updated data stream mapping for adjusting the data capacity in the data stream transmitted over the data stream communication channel for the at least one data producing software application.

12. The system according to clause 11, wherein the at least one processor is further configured to receive an update request by a user to add more data capacity for the at least one data producing software application over at least one predefined time interval from a graphic user interface coupled to the processor.

13. The system according to clause 12, wherein the at least one processor is configured to adjust the data capacity for the at least one data producing software application by adding more data capacity for the at least one data producing software application over at least one predefined time interval in response to the update request by the user by increasing the number of data shards.

14. The system according to clause 13, wherein the at least one processor is further configured to reduce the number of the data shards in the data stream assigned to the at least one data producing software application after the at least one predefined time interval.

15. The system according to clause 11, wherein the data streaming service comprises Amazon Kinesis or Apache Kafka.

16. The system according to clause 11, wherein the at least one processor is further configured to receive in real-time from the transmitting data interface, data traffic in the data input for each of the plurality of data producing software applications.

17. The system according to clause 16, further comprising a display, and wherein the at least one processor is further configured to output in real-time, by the processor, the data traffic in the data input for each of the plurality of data producing software applications on a graphic user interface displayed on the display.

18. The system according to clause 16, wherein the at least one processor is configured to adjust the data capacity for the at least one data producing software application by dynamically adding more data capacity for the at least one data producing software application when the data traffic for the at least one data producing software application increases above a predefined threshold by increasing the number of data shards.

19. The system according to clause 18, wherein the at least one processor is further configured to dynamically reduce the added data capacity for the at least one data producing software application when the data traffic for the at least one data producing software application falls below the predefined threshold.

20. The system according to clause 19, wherein the at least one processor is further configured to dynamically reduce the added data capacity for the at least one data producing software application by decreasing the number of data shards in the data stream assigned to the at least one data producing software application.

21. A method, comprising:
receiving, by a processor, from a transmitting data interface, a data stream mapping of a data input into a plurality of data sub-units for transmission in a data stream over a data stream communication channel from the transmitting data interface to a receiving data interface;
wherein the data input is generated by a plurality of data producing software applications;
wherein the transmitting data interface and the receiving data interface are managed by a data streaming service;
wherein each data sub-unit is defined by a start hash key and an end hash key in a range of hash keys assigned by the data streaming service;
adjusting, by the processor, data capacity for at least one data producing software application in the plurality of data producing software applications by increasing or decreasing a number of data sub-units in the data stream assigned to the at least one data producing software application;
generating, by the processor, an updated data stream mapping of the data input into the plurality of data sub-units by updating the start hash key and the end hash key in the range for each of the number of data sub-units assigned to the at least one data producing software application in the data stream mapping; and
sending, by the processor, to the transmitting data interface, the updated data stream mapping for adjusting the data capacity in the data stream transmitted over the data stream communication channel for the at least one data producing software application.

22. The method according to clause 21, wherein the data streaming service comprises Amazon Kinesis, and wherein the plurality of data sub-units comprises a plurality of data shards.

23. The method according to clause 21, wherein the data streaming service comprises Apache Kafka, and wherein the plurality of data sub-units comprises a plurality of data partitions.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method, comprising:
dynamically adjusting, by a processor, in a data stream over a data stream communication channel, data capacity for at least one data producing software application in a plurality of data producing software applications by increasing or decreasing a number of data shards in the data stream assigned to the at least one data producing software application when data traffic for the at least one data producing software application respectively increases above a predefined threshold or decreases below the predefined threshold;
wherein each data shard is defined by a start hash key and an end hash key in a range of hash keys in accordance with a data stream mapping assigned by a data streaming service;
generating, by the processor, an update of the data stream mapping of the data stream by updating the start hash key and the end hash key in the range for each of the number of data shards assigned to the at least one data producing software application in the data stream mapping;
receiving, by the processor, an update request by a user to add more data capacity for at least one particular data producing software application in the plurality of data producing software applications over at least one predefined time interval from a graphic user interface coupled to the processor; and
overriding, by the processor, in response to the update request, the dynamic adjusting of the data capacity for the at least one particular data producing software application by increasing the number of data shards for the at least one particular data producing software application over the at least one predefined time interval.

2. The method according to claim 1, further comprising receiving, by the processor, from a transmitting data interface, the data stream mapping of the data stream into a plurality of data shards for transmission in the data stream from a transmitting data interface to a receiving data interface.

3. The method according to claim 2, further comprising sending, by the processor, to the transmitting data interface, the update of the data stream mapping for adjusting the data capacity in the data stream transmitted over the data stream communication channel for the at least one data producing software application.

4. The method according to claim 1, further comprising reducing, by the processor, the number of the data shards in the data stream assigned to the at least one particular data producing software application after the at least one predefined time interval.

5. The method according to claim 1, wherein the data streaming service comprises Amazon Kinesis or Apache Kafka.

6. The method according to claim 1, further comprising outputting in real-time, by the processor, the data traffic in the data stream for each of the plurality of data producing software applications on a graphic user interface.

7. The method according to claim 1, further comprising transmitting, by the processor, at least one command to a receiving data interface to route the data shards in the data stream to each intended data consumer in accordance with the data stream mapping.

8. The method according to claim 1, further comprising generating, by the processor, a set-up request to the data streaming service to create the data stream to be transmitted over the data stream communication channel with an initial predefined data capacity.

9. A system, comprising:
a memory; and
at least one processor configured to execute code stored in the memory that causes the at least one processor to:
dynamically adjust in a data stream over a data stream communication channel, data capacity for at least one data producing software application in a plurality of data producing software applications by increasing or decreasing a number of data shards in the data stream assigned to the at least one data producing software application when data traffic for the at least one data producing software application respectively increases above a predefined threshold or decreases below the predefined threshold;
wherein each data shard is defined by a start hash key and an end hash key in a range of hash keys in accordance with a data stream mapping assigned by a data streaming service;
generate an update of the data stream mapping of the data stream by updating the start hash key and the end hash key in the range for each of the number of data shards assigned to the at least one data producing software application in the data stream mapping;
receive an update request by a user to add more data capacity for at least one particular data producing software application in the plurality of data producing software applications over at least one predefined time interval from a graphic user interface coupled to the processor; and
override, in response to the update request, the dynamic adjusting of the data capacity for the at least one particular data producing software application by increasing the number of data shards for the at least one particular data producing software application over the at least one predefined time interval.

10. The system according to claim 9 wherein the at least one processor is further configured to receive, from a transmitting data interface, the data stream mapping of the data stream into a plurality of data shards for transmission in the data stream from a transmitting data interface to a receiving data interface.

11. The system according to claim 9 wherein the at least one processor is further configured to send the update of the data stream mapping for adjusting the data capacity in the data stream transmitted over the data stream communication channel for the at least one data producing software application.

12. The system according to claim 9, wherein the at least one processor is further configured to reduce the number of the data shards in the data stream assigned to the at least one data producing software application after the at least one predefined time interval.

13. The system according to claim 9, wherein the data streaming service comprises Amazon Kinesis or Apache Kafka.

14. The system according to claim 9, further comprising a display, and wherein the at least one processor is further configured to output in real-time the data traffic in the data stream for each of the plurality of data producing software applications on a graphic user interface displayed on the display.

15. The system according to claim 9, wherein the at least one processor is further configured to transmit at least one command to a receiving data interface to route the data shards in the data stream to each intended data consumer in accordance with the data stream mapping.

16. The system according to claim 9, wherein the at least one processor is further configured to generate a set-up request to the data streaming service to create the data stream to be transmitted over the data stream communication channel with an initial predefined data capacity.

* * * * *